United States Patent
Hedgpeth

[19]

[11] Patent Number: 6,125,838
[45] Date of Patent: Oct. 3, 2000

[54] GAS GRILL WITH INTERNAL BAFFLES FOR USE IN HIGH WIND CONDITIONS

[75] Inventor: D. Ben Hedgpeth, Niwot, Colo.

[73] Assignee: Grills and Gadgets, Inc., Longmont, Colo.

[21] Appl. No.: 09/470,118

[22] Filed: Dec. 22, 1999

Related U.S. Application Data

[60] Provisional application No. 60/113,496, Dec. 22, 1998.

[51] Int. Cl.[7] .................................................. A47J 37/00
[52] U.S. Cl. ...................... 126/41 R; 126/39 R; 126/305; 126/51
[58] Field of Search ............................. 126/307 A, 25 R, 126/41 R, 41 B, 40, 304 R, 50, 51, 38, 15 R, 9 R, 305, 19 R, 20, 25 B, 39 R; 99/446, 339, 340, 447, 400

[56] References Cited

U.S. PATENT DOCUMENTS

| | | | |
|---|---|---|---|
| 3,800,748 | 4/1974 | Schindler | 126/307 A |
| 4,043,312 | 8/1977 | Kern | 126/41 R |
| 4,334,462 | 6/1982 | Hefling | 126/41 R |
| 4,662,349 | 5/1987 | McKenzie | 126/41 R |
| 4,893,609 | 1/1990 | Giordani et al. | 126/307 A |
| 5,158,069 | 10/1992 | Hamos | 126/307 A |
| 5,605,142 | 2/1997 | Parker | 126/39 R |

*Primary Examiner*—James C. Yeung
*Attorney, Agent, or Firm*—Sheridan Ross P.C.

[57] ABSTRACT

A gas grill is provided which is designed for use in a high wind environment such as that which is typical on watercraft, and which incorporates a series of wind resistant baffles which deflect the flow path of combustion air.

22 Claims, 8 Drawing Sheets

GAS GRILL WITH INTERNAL BAFFLES FOR USE IN HIGH WIND CONDITIONS

The present application claims priority of U.S. provisional patent application S/N 60/113,496, having a filing date of Dec. 22, 1998, and is incorporated herein in its entirety by reference.

FIELD OF THE INVENTION

The present invention relates to gas grills and, in particular, to gas grills used in high wind conditions such as those often found in boating and recreational vehicle environments.

BACKGROUND OF THE INVENTION

The primary source for oxygen for a grill comes from below the burner. Conventional grills have vents located near the bottom of the grill, below the burner, to allow for air flow which supplies the necessary oxygen. However, if the airflow through these vents is at too high a velocity, the flame at the burner can be blown out. This can cause conventional grills to be virtually useless. in high wind environments.

Additionally, other areas of high velocity airflow can also disrupt the burner operation. One such area is the venturi assembly. Conventional grills have a venturi tube for mixing propane and air which is generally located outside of the grill tub. High wind conditions can result in this mixture being diluted too much, resulting in the burner flame going out. Additionally, high velocity airflow in the area directly above the burner can disrupt the burner operation. This can occur either when the grill hood is open, allowing the wind to access the top of the burner through the heat diffusing material, which typically consists of rocks or ceramic bricketts. Wind can also affect burner operation through vents in the grill hood when the hood is closed. In any of these cases, the high wind conditions can cause the flame at the burner to go out, and thus the grill must be re-lit, if possible, in order to continue operation.

Based on the foregoing, there is a need for a grill which overcomes these problems and protects the flame at the burner from high velocity airflow.

SUMMARY OF THE INVENTION

The present invention provides a grill containing wind baffles which redirect and slow the airflow prior to the air getting to the burner. This allows an oxygen supply, but reduces the velocity of the air, allowing the burner to maintain its function in windy conditions. The wind baffles consists of a series of wind deflectors arranged in a specific order to control air velocity and prevent wind from entering the combustion chamber and extinguishing or disrupting the flame. Thus, it is one object of the present invention to provide a gas grill which may be used in high wind conditions such as those present on recreational watercraft such as yachts and large sailboats.

Additionally, the present invention provides a heat diffuser designed for the dual purpose of heat diffusion and wind resistance. The heat diffuser is a metal plate that is located above the grill burner. It completely covers the burner and is shaped in such a fashion to evenly distribute heat from the Burner while allowing spent gases to rise and exhaust from the combustion chamber, and protect the burner from high air velocity from above.

The present invention also provides a venturi assembly which is resistant to high wind conditions. Venturi assembly is comprised of a propane control valve, a propane delivery tube, and a metering orifice to allow propane to flow. The venturi assembly is located within the grill tub, and is thus protected from high wind conditions. In another embodiment, the venturi assembly is located outside of the grill tub, and is protected by a wind baffle which serves to protect the venturi assembly from high wind.

The present invention also provides slide vents located on each side of the grill hood which can be used to control overhead air flow when the grill hood is closed. Additionally, the present invention can be easily handled and stored, and has all of the parts attached to the base unit to help provide protection from parts loss. The grill of the present invention is also constructed of materials which provide resistance to adverse effects of saltwater, thus providing increased lifetime for the grill. Thus, in one aspect of the present invention a gas grill is provided for use in a high wind environment, and which comprises:

a grill housing, said grill housing consisting of a grill hood and a grill tub;
said grill hood having at least one ventilation port for air ventilation;
said grill tub having at least one air ventilation port, a fuel port for receiving a fuel conduit, a plurality of baffles, a combustion chamber, a burner unit and a grill cooking surface;
said plurality of baffles having at least one air ventilation aperture, and said plurality of baffles being positioned in a vertical stacking relationship within said grill tub such that the air ventilation apertures in each baffle are offset within the grill tub to create a serpentine air flow path through said baffles;

DETAILED DESCRIPTION

Figure 1:
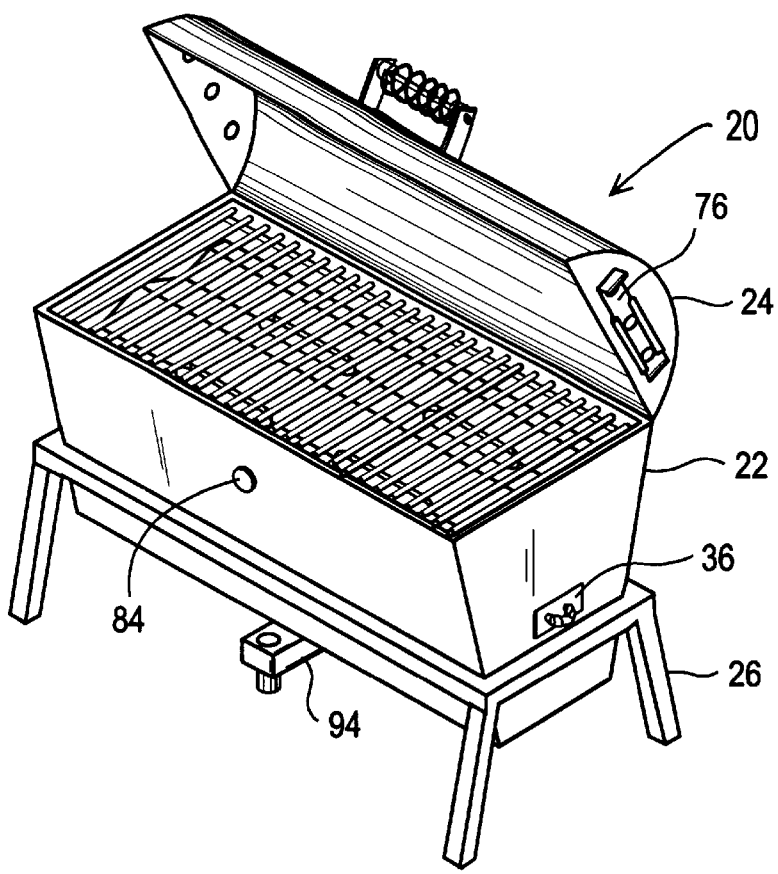
FIG. 1 is a front perspective of the gas grill with internal baffles.

While this invention is susceptible of embodiments in many different forms, there is shown in the drawings and will herein be described in detail, preferred embodiments of the invention with the understanding that the present disclosure is to be considered as being exemplary of the principles of the invention and is not intended to limit the broad aspects of the invention to the embodiments illustrated.

Figure 2:
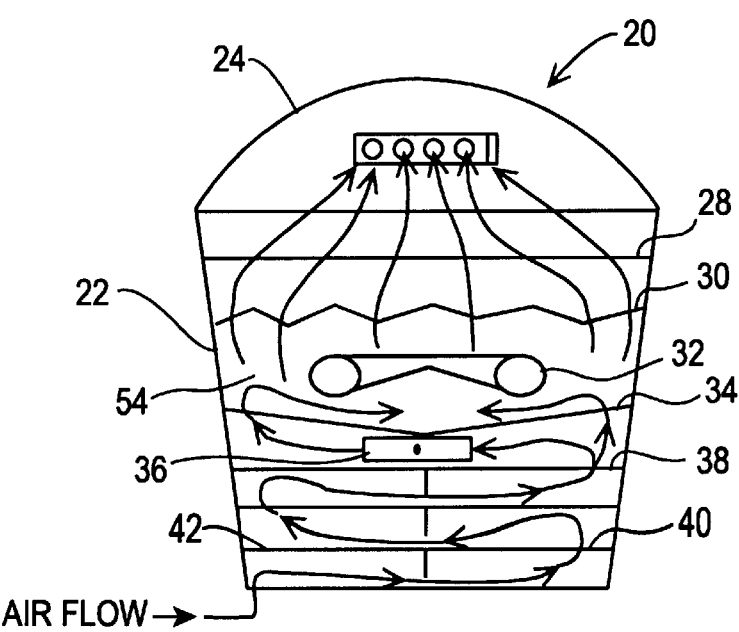
FIG. 2 is a left cross-sectional view of the invention shown in FIG. 1 and identifying the internal components.
Figure 3:
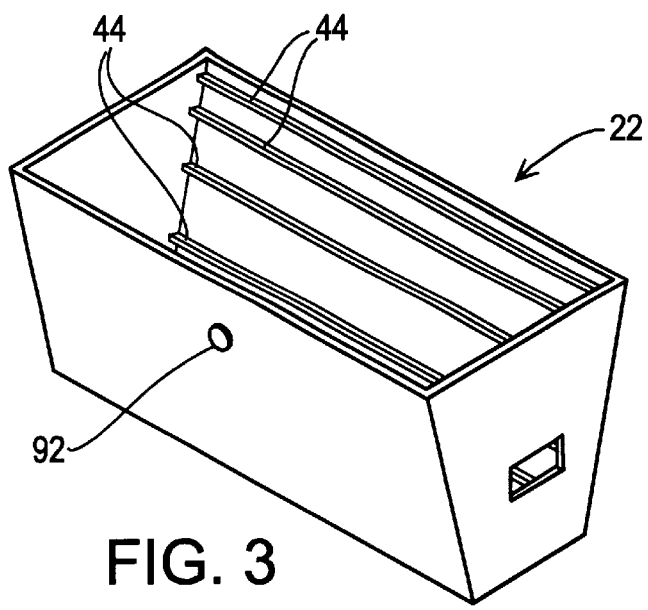
FIG. 3 is a front perspective view of the grill tub.

Referring to FIG. 1, a grill 20 is depicted for use in both windy and mild conditions. The grill 20 consists generally of a grill tub 22 and a grill hood 24. The grill 20 may rest on a grill stand 26. Referring now to FIG. 2, the grill tub 22 contains several components, including a grill cooking surface 28, heat diffuser 30, burner 32, excess grease deflector 34, grease and ash accumulator 36, and wind baffles 38–42. In a preferred embodiment, the grill tub 22 is rectangular, however is should be understood that the grill tub 22 could be round, square, oval or most any shape. Referring now to FIG. 3, the grill tub 22 is preferably designed with the bottom smaller than the top. This design dictates how each internal component will fit inside the grill tub 22 assuring proper assembly and reassembly. Inside the grill tub 22 are component stop tabs 44 which provide a resting place for each component on the grill tub 22 wall. The grill tub 22 also has ventilation apertures 45 and a fuel access port 46. In the preferred embodiment, the grill tub 22 is constructed from anodized cast aluminum or stainless steel.

Figure 4:
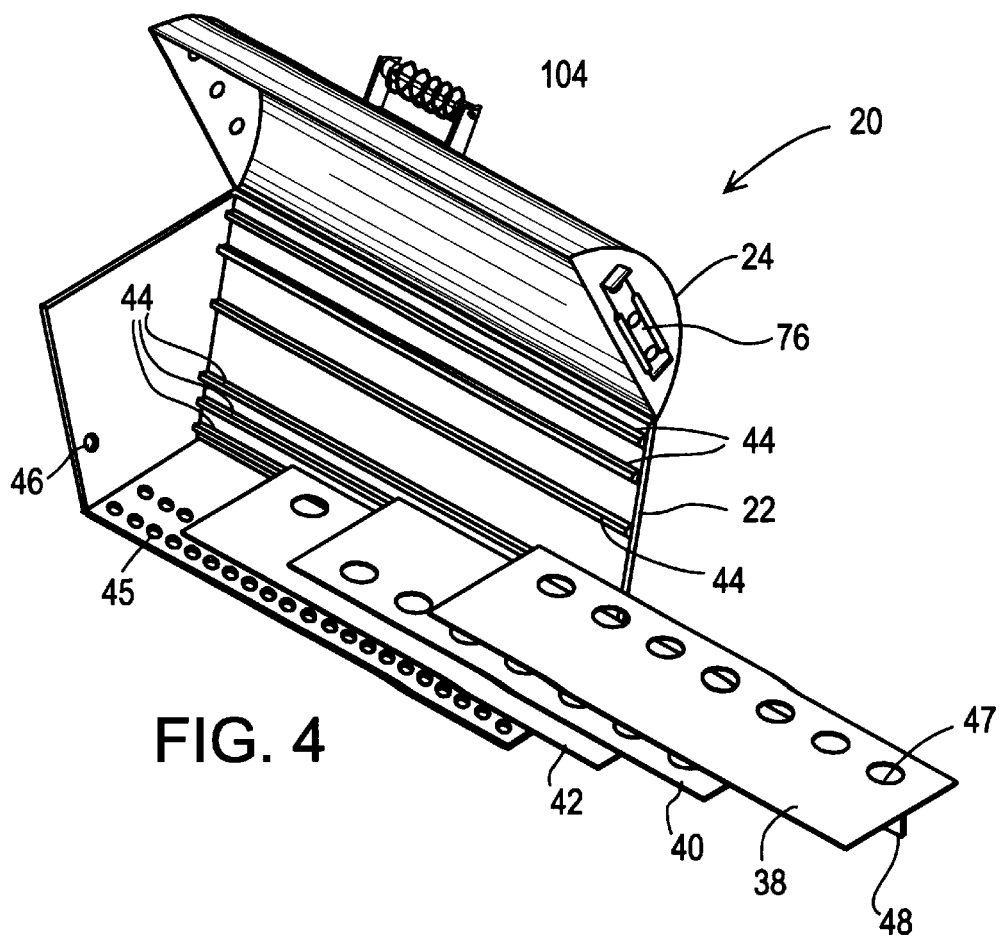
FIG. 4 is a front cut-away perspective view of the invention of FIG. 1.
Figure 5:
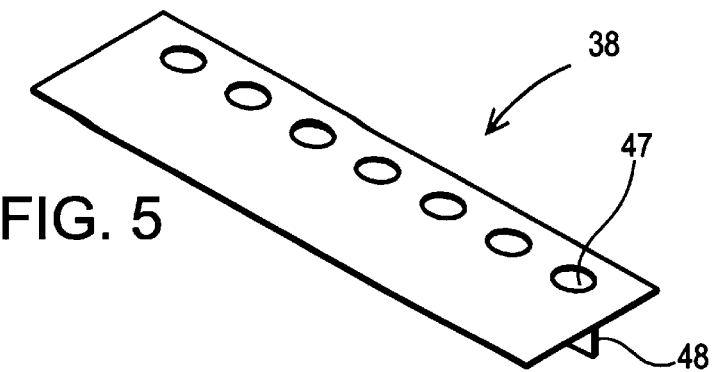
FIG. 5 is a front perspective view of a baffle.
Figure 6:
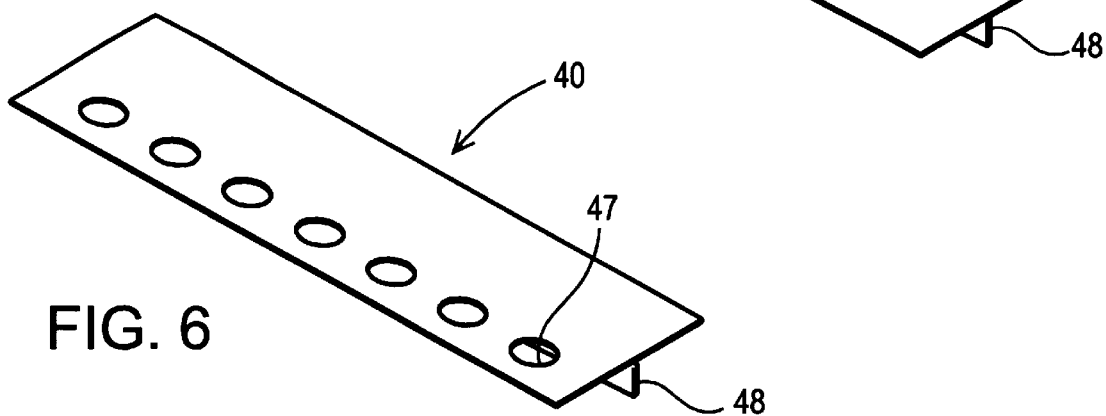
FIG. 6 is a front perspective view of an alternate baffle design.

Referring now to FIGS. 4 through 6, a series of baffles 38–42 are located within the grill tub 22, and rest upon component stop tabs 44. The baffles 38–42 consist of an upper baffle 38, a middle baffle 40, and a lower baffle 42. Each baffle 38–42 has a series of air ventilation apertures 47 running the length of the baffle 38–42 on one side. The baffles 38–42 are arranged in manner so the air ventilation apertures 47 are offset on every other baffle 38–42, as shown in FIG. 4, to slow the wind velocity and allow sufficient air for proper combustion. Preferably, a serpentine flow path is created to decrease the wind velocity. On the bottom of each baffle 38–42 is an airflow disruption vein 48 that further reduces the velocity of the airflow. Although the air ventilation apertures 47 shown are circular in one embodiment, it should be understood that any geometric configuration could be used including squares, rectangles or triangular shapes. Additionally, one long slot as opposed to a plurality of ventilation apertures 47 could be used to accomplish the same purpose.

Further, the baffles 38–42 are designed such that the lower baffle 42 fits on the lower most component stop tab 44. The middle baffle 40 has a slightly wider width, allowing it to rest upon the next higher component stop tab 44, and the upper baffle 38 rests upon the next higher again component stop tab 44. Although the baffles are preferably constructed of stainless steel, other durable, heat resistant material or ceramic materials could be used for the same purpose as appreciated by one skilled in the art.

Figure 7:
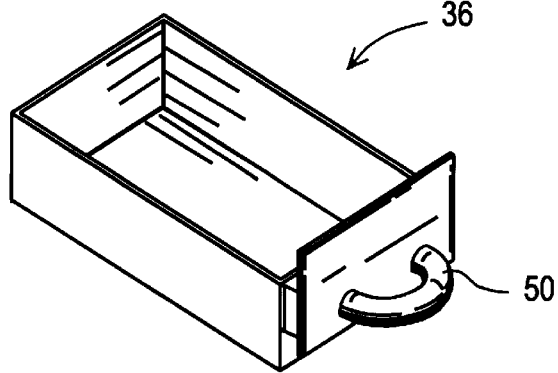
FIG. 7 is a front perspective view of the grease and ash accumulator.

Referring now to FIG. 7, directly above the upper baffle 38 sits the grease and ash accumulator 36. The grease and ash accumulator 36 is a small slide out tray designed to catch grease and ash from the cooking food. The grease and ash accumulator acts to collect cooking grease and ashes, and has a handle 50 which allows for ease of emptying and cleaning. The grease and ash accumulator 36 is inserted into the grill tub 22 through an opening on the side of the grill tub 22 and rests upon the upper baffle 38. The grease and ash accumulator 36 and is constructed of stainless steel in the preferred embodiment.

Figure 8:
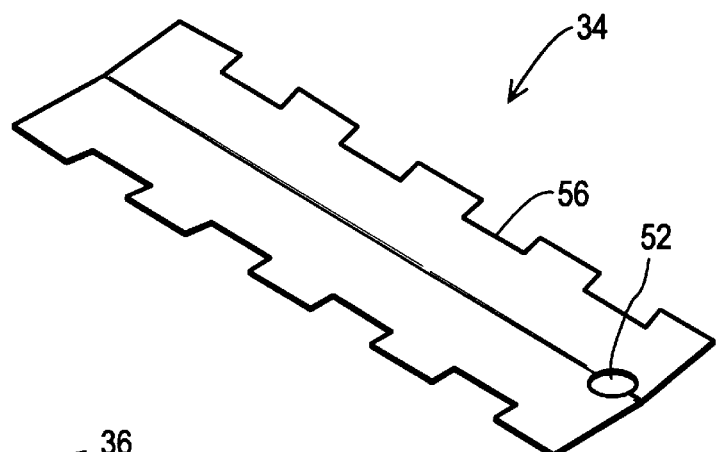
FIG. 8 is a front perspective view of the excess grease deflector.

Referring now to FIG. 8, directly above the grease and ash accumulator 36 rests an excess grease deflector 34. The excess grease deflector 34 allows grease from the grill to accumulate and run to the grease and ash accumulator 36. It is angled so grease and ashes flow downward to one end and out an exit aperture 52 for collection by the ash and grease accumulator 36 for disposal and cleaning. The excess grease deflector 34 preferably rests upon the component stop tab 44 above the upper baffle 38. The excess grease deflector 34 has three functions. First, it captures and directs the flow of cooking grease and ash to the grease and ash accumulator 36. Second, it prevents cooking grease and other debris from falling into the baffles 38–42 and reducing their functionality. Third, it functions as the last baffle and directs airflow to the sides of the grill 20 as the air is entering the combustion chamber 54.

In one embodiment, the design of the excess grease deflector 34 consists of a sheet of stainless steel, the size of the inside of the grill. The sheet is bent in the middle making it V shaped, held in place by component stop tabs 44 on the sides of the grill tub 22, and angled towards one end of the grill 20. Airflow notches 56 are cut out of the front and back of the sheet (the long sides of the sheet). The exit aperture 52 is cut in the end of the sheet that is at the lowest point on the incline of the sheet. The grease and ash accumulator 36 fits through the side of the grill tub 22 and is placed under the end of excess grease deflector 34 with the exit aperture 52. The grease and ash accumulator 36 catches the ashes, grease and other cooking debris. The excess grease deflector 34 effectively seals the top of the grill from the baffles 38–42.

Figure 9:
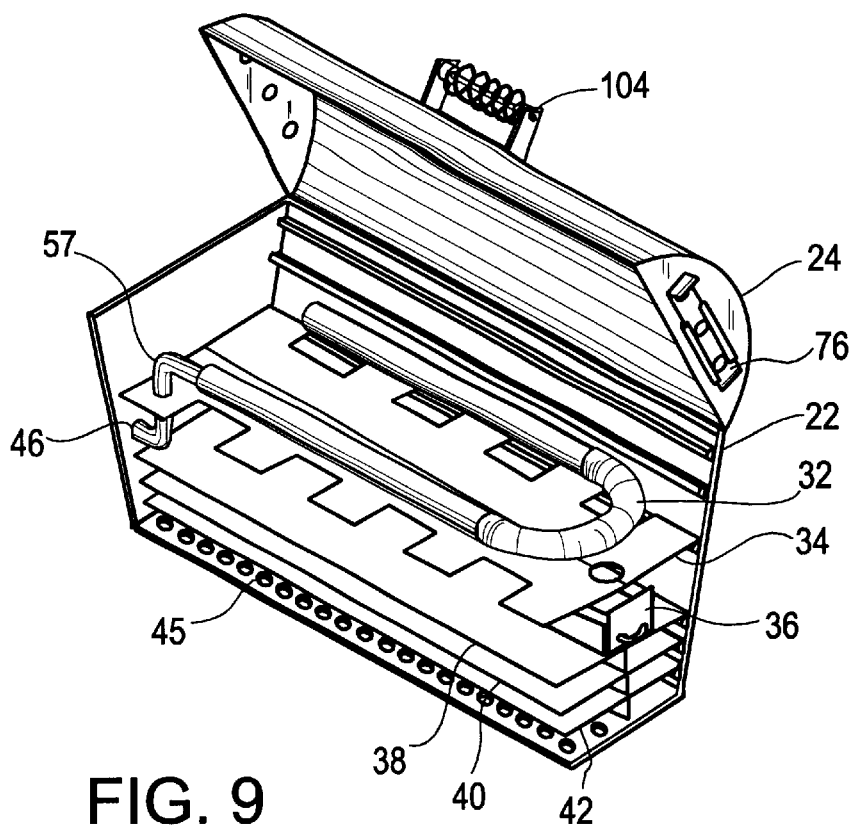
FIG. 9 is a front cut-away perspective view of the invention of FIG. 1.
Figure 10:
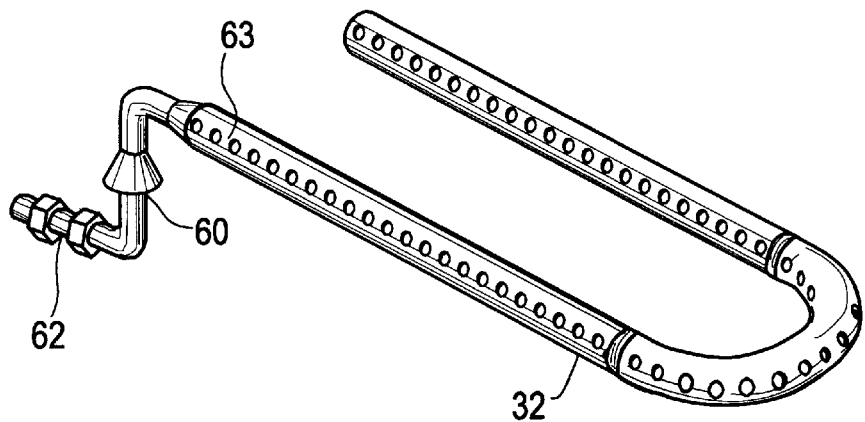
FIG. 10 is a front perspective view of the burner assembly.

Referring now to FIGS. 9 and 10, the burner 32 resides in the combustion chamber 54 above the excess grease deflector 34. The burner 32 connects with a propane or natural gas fuel source via a fuel conduit 57. The fuel conduit 57 connects the burner 32 to a fuel source (not shown) through a fuel access port 46 located on one side of the grill tub 22. The fuel conduit 57 consists of a propane control valve assembly 58, shown in FIG. 11, an air and gas-mixing venturi 60, and a gas inflow pipe 62. The burner 32 is generally an elongated tube or cylinder shape running in a U shaped pattern. The burner 32 has burner holes 63 in it where propane escapes and combustion takes place. Depending upon the manufacturing plan, the burner 32 may have several parts. A tube burner assembly 32, as in the figures, consists of two parts. The first part being a tube with holes 63 drilled in it and closed at one end. The diameter and hole size would depend upon the BTU rating recommended by the manufacture of the burner 32. The second part is a gas mixing venturi 60, shown in FIG. 12, with a first end that fits into the open end of the burner 32 and a second end having an air and propane mixing venturi chamber.

Another option for the burner would be a chamber burner (not shown), which has three parts. The first and second parts are two concave stamped pieces of metal with the desired size of the burner with a flared edge and an intake groove at one end. One piece has holes drilled in it to allow the gas and air mixture out of the burner. The two pieces are mated using a pressing process on the flared edges, creating an air tight seal. The result is a burner with an air chamber inside and a hole in one end to fasten the venturi tube. The third part is a venturi pipe as described above, except the non-venturi end is fashioned to be connected with the burner chamber assembly.

The burner 32 can be various shapes. More specifically, the tube burners consist of a metal tube(s), closed on one end and open on the other allowing a propane air mixture to flow throughout the burner 32. The open end of the burner 32 has a gas mixing venturi 60 for mixing a fuel such as propane with air, creating a combustible gaseous mixture that ignites when exiting the burner 32 in the presence of a spark or flame.

Chamber burners generally consist of stamped metal concave assemblies that are joined together to create a single chamber. To allow the propane and air mixture to escape, holes are drilled on fabricated on the bottom of the metal burner. The propane and air are mixed in a venturi tube similar to the tube described above and delivered to the chamber area inside the burner.

The burner 32 is made from metal with a high melting point. Stainless steel is often used due to its resistance to rust and the adverse effects of salt-water environments. Additionally, as is understood by those of skill in the art, there can be multiple burners per grill depending upon the size of the grill.

Figure 12:
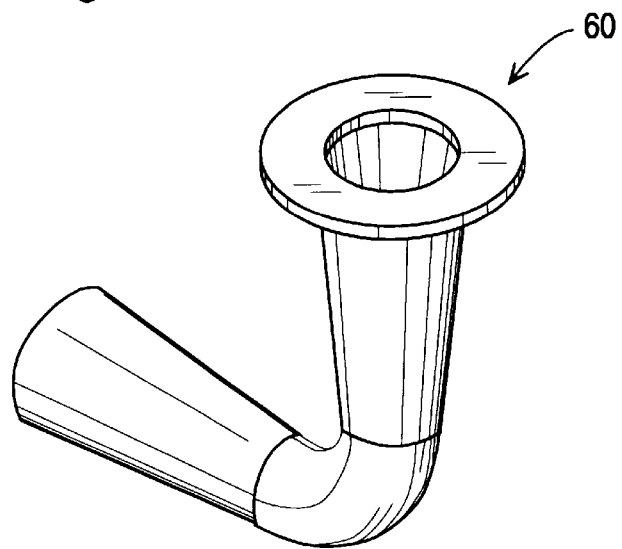
FIG. 12 is a front perspective view of the gas mixing venturi.
Figure 13:
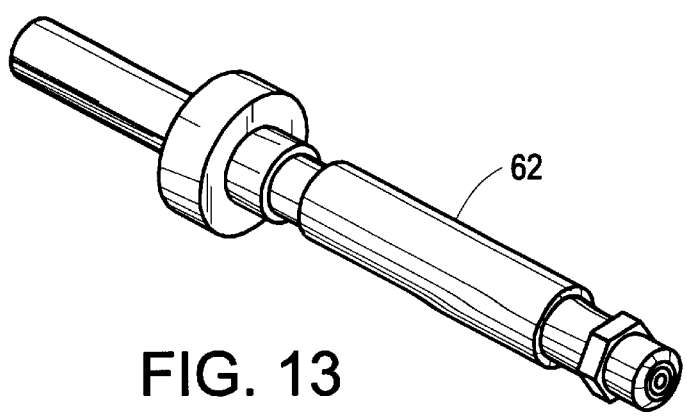
FIG. 13 is a front perspective view of the gas inflow pipe.

The gas mixing venturi 60, shown in detail in FIG. 12, is located in the fuel conduit 57 between the end of the gas inflow pipe 62, shown in detail in FIG. 13, and the burner 32. The gas mixing venturi 60 is flared at one end so the end of the gas inflow pipe 62 can fit inside the gas mixing venturi 60 with ample room for air flow around the gas inflow pipe 62. In the preferred embodiment, the gas mixing venturi 60 is located within the grill tub 22, and is thus shielded from any wind. In another embodiment, the gas mixing venturi 60 is located outside of the grill tub 22 has a wind shield cover, consisting of a tube section larger in diameter than the gas mixing venturi 60. The wind shield cover has holes drilled in it to redirect air and reduce air speed prior to air entering the gas mixing venturi 60 area.

Figure 11:
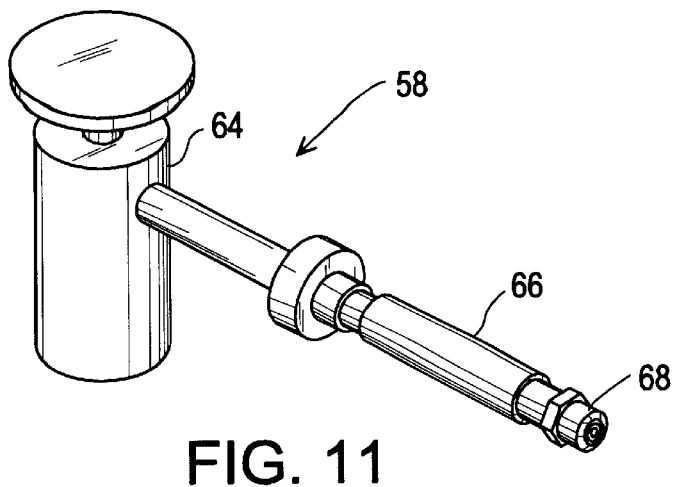
FIG. 11 is a front perspective view of the propane control valve assembly.

Referring now specifically to FIG. 11, the propane control valve assembly (PCVA) 58 is a metering device allowing precise control of fuel to combustion area thus regulating heat to the grill cooking surface 28, and is comprised of three parts. The first part is a propane control valve 64 that regulates the flow of propane to the grill. The second part is a propane delivery tube 66 that screws into the propane control valve and connects with the gas inflow pipe 62 of the fuel conduit 57 via a round brass threaded plug 68 with a metering orifice in it to allow propane to flow. The PCVA 58 has three functions. First, it safely connects with a propane gas source. Second, it regulates and meters the flow of propane gas to the burner 32. Third, it delivers the gas to the burner 32 through the fuel conduit 57. The PCVA 58 can be purchased from a manufacturer, as there are a number of quality manufactures that make a valve that will satisfy the requirements. The material for the propane control valve 64 will be determined by the manufacturer of the valve. The propane delivery tube 66 is preferably a metal that has minimal reaction with salt water. Preferably, the round brass threaded plug 68 is brass.

Figure 14:
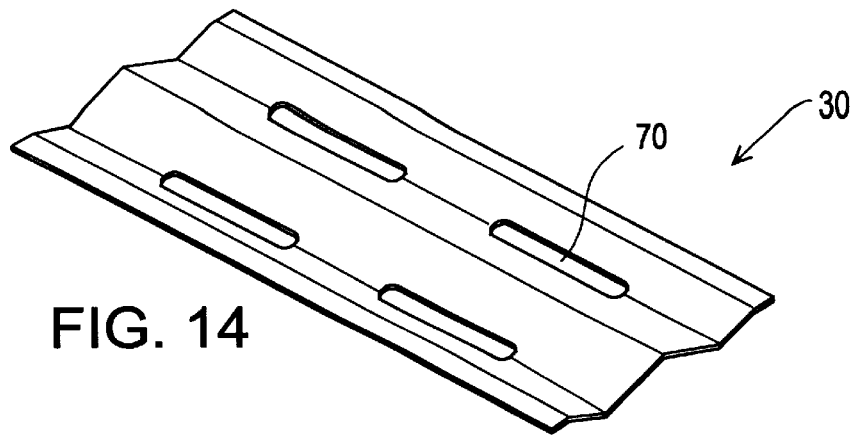
FIG. 14 is a front perspective view of the heat diffuser.

Referring now to FIG. 14, the heat diffuser 30 is a plate that is located above the burner 32. The heat diffuser 30 completely covers the burner 30 and is shaped in such a fashion to evenly distribute heat from the burner while allowing spent gases to rise and exhaust from the combustion chamber 54. The heat diffuser 30 has three functions. First, heat is absorbed from the burner 32 and spread relatively evenly throughout the heat diffuser 30. This function provides even heating for the grill cooking surface 28 located immediately above the heat diffuser 30. Second, the heat diffuser 30 collects ashes and debris from the grill assembly 28 where it is heated and vaporizes or burns to a fine ash that drops through heat diffuser slits 70 for collection on the excess grease deflector 34 located just below the burner 32. This inhibits ashes and cooking debris from dropping on and clogging the burner 32. Third, the heat diffuser 30 functions as an air baffle that protects the burner 32 from wind and down drafts coming from above. This inhibits "burner blowout" and allows the grill to continue cooking in windy conditions.

The design of the heat diffuser 30 is rectangular in a preferred embodiment, however it can be round, oval, square, or rectangular to match any grill shape. The heat diffuser 30 is thick enough to prevent excessive warping and distortion caused by extreme heat. It encompasses the entire area below grill assembly 28 and is a series of wedge or 45 degree bends which allows even heating. Heat diffuser slits 70 are cut or formed in the heat diffuser 30 to allow ashes to fall through to the excess grease deflector 34 located below. The heat diffuser slits 70 also allow air and gasses to rise and leave the combustion chamber 54. The surface shape of the heat diffuser 30 is rippled to allow greater heating surface and retention of heat. The surface shape can take many forms so long as heat is evenly distributed over the entire surface.

The heat diffuser 30 can be made of many materials from ceramics to stainless steel. The preferred embodiment uses stainless steel that performs well in salt water environments and is an excellent heat conductor. Current ceramics may be overly brittle and subject to breaking in the portable grill environment.

Figure 15:
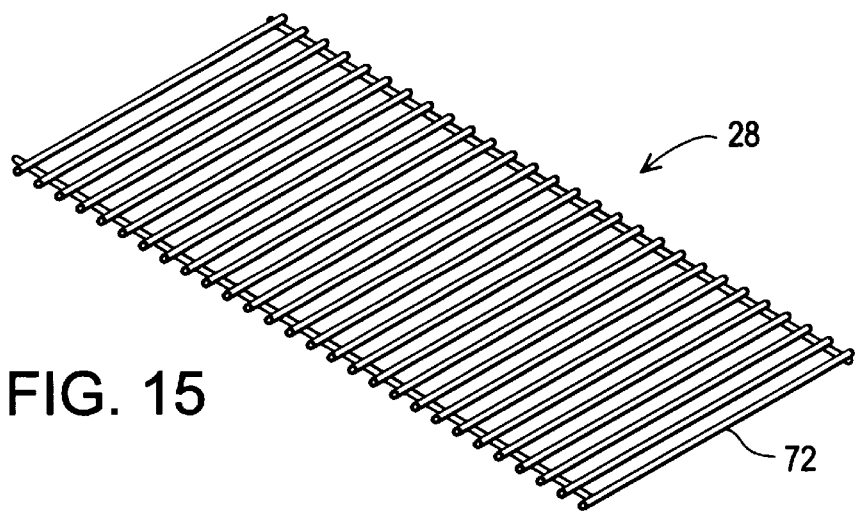
FIG. 15 is a front perspective view of the grill cooking surface.

Referring now to FIG. 15, the grill cooking surface 28 is the actual cooking surface which supports any food items needing to be cooked. The grill cooking surface 28 is constructed from a series of small tubes or stringers 72 attached together making a grid surface where food is placed for cooking. The grill cooking surface 28 is constructed of stainless steel in the preferred embodiment.

Figure 16:
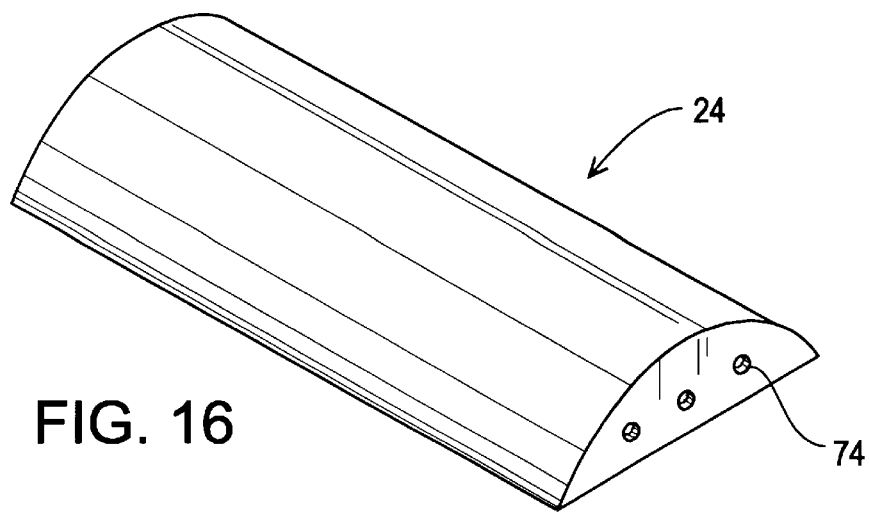
FIG. 16 is a front perspective view of the grill hood.

Referring now to FIG. 16, the grill hood 24 is an enclosure that covers the cooking surface of the grill 20, allowing temperature control and protection of food from the elements. The grill hood 24 contains ventilation ports 74 for proper combustion and a means of exhausting gases. The shape of the grill 20 dictates the design of the grill hood 24. A half round cylinder shape to cover the cooking surface is shown in the preferred embodiment. The grill hood 24 has ventilation ports 74 in each end of the hood. Holes are drilled to attach hinges, a handle, and two slide vent controls 76 for regulating airflow. The grill hood 24 is attached to the grill tub 22 by two hinges (not shown) which allow the grill hood 20 to be opened and closed. The hinges also have hard stops, which allow the grill hood 24 to be opened far enough so that the grill hood 24 will rest upon the hard stops when in the open position such that the weight of the grill hood 24 will be far enough back to keep the grill hood 24 from falling back closed, yet keeping the grill hood 24 in a somewhat upright position so that it can still be easily closed.

Figure 17:
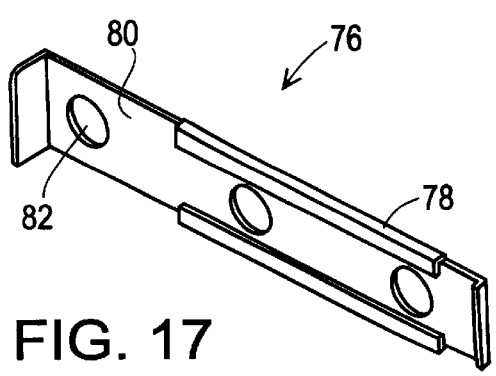
FIG. 17 is a front perspective view of a slide vent control.

Referring again to FIG. 1, the slide vent controls 76 are located on each side of the grill hood 24. As shown in detail in FIG. 17, each slide vent control 76 has two parts, the slide cradle 78 and the slide 80. The slide 80 has slide vent ports 82 which, when the slide is completely pushed in, align with the ventilation ports 74 in the grill hood 24. The slide vent control 76 regulate the airflow into and out of the grill hood 24 and control the cooking temperature. When there is little or no wind the slide vent controls 76 are pushed in completely, fully exposing the ventilation ports 74 in the grill hood 24. As winds increase, the slide 80 can be pulled out in the direction of the front of the grill 20. This reduces the airflow through the grill hood 24 by partially closing the ventilation ports 74, thus allowing the burner flame to be protected from high velocity winds or down drafts. In the preferred embodiment, the slide cradle 78 is made of stainless steel and the slide 80 is made of brass.

Figure 18:
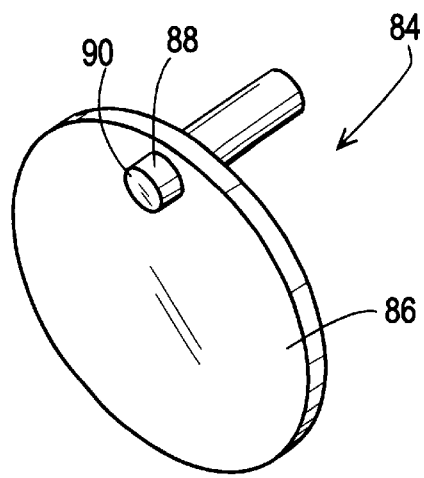
FIG. 18 is a front perspective view of the ignition cover.

Referring again to FIG. 1, the ignition cover 84, shown in detail in FIG. 18, is a small round plate 86 with an aperture 88 for a mounting bolt 90. The ignition cover 84 is attached to the front of the grill tub 22 with a mounting bolt 90, locking washers and a nut (not shown). The purpose of the ignition cover 84 is to cover the ignition aperture 92, shown in FIG. 3, in the side of the grill tub 22 that is used to access the combustion chamber 54 for lighting the propane air mixture. The ignition cover 84 is necessary to protect the burner 32 from wind and drafts that might disturb the flame. In the preferred embodiment, the ignition cover 84 is round and made of stainless steel. It is bolted or screwed to the front or side of the grill 20 just above the ignition aperture 92 in the grill tub 22.

Figure 19:
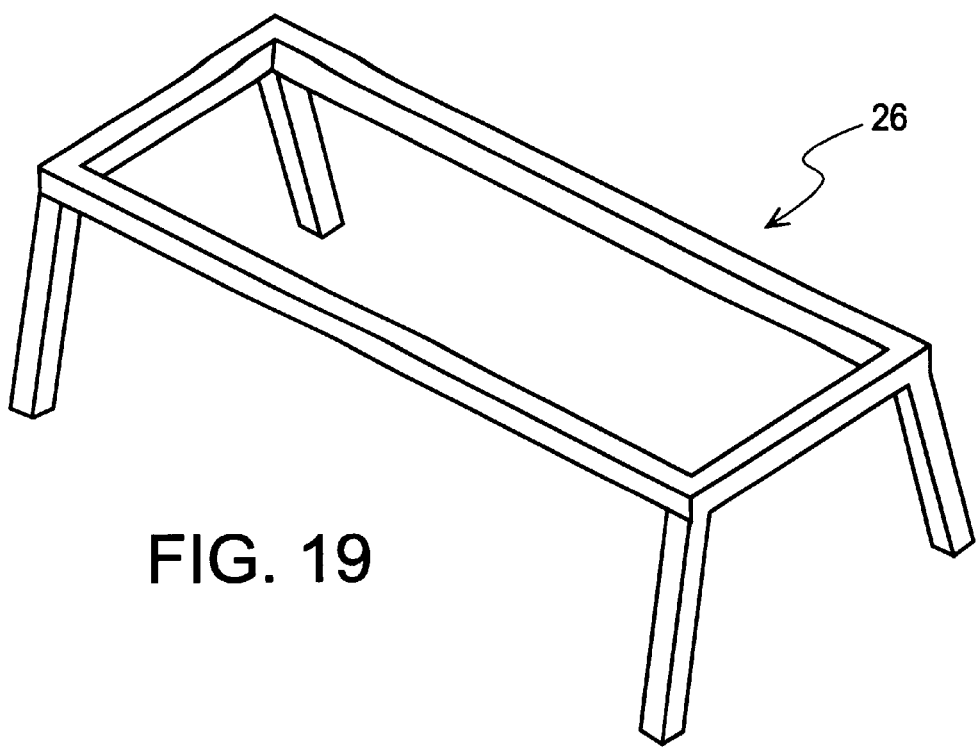
FIG. 19 is a front perspective view of the grill stand.
Figure 20:
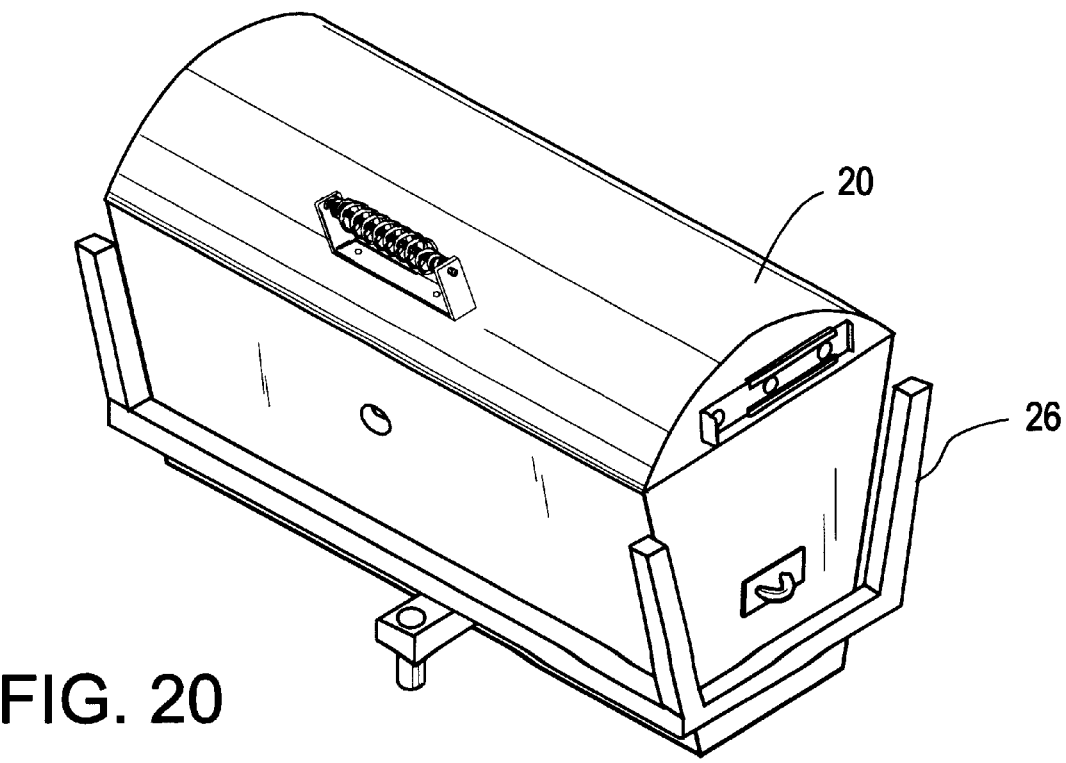
FIG. 20 is a front perspective view of the invention of FIG. 1 placed within the grill stand of FIG. 19 for storage or transport.

Referring now to FIG. 19, the stand 26 will now be described in detail. The stand 26 is designed so the base of the grill 20 will rest inside providing a stable, safe, and convenient mount for the grill 20 to be placed on a surface for cooking. The stand 26 is a one-piece apparatus shaped to fit the base of the grill 20. The stand 26 allows the grill 20 to be placed on it while keeping the grill 20 elevated from the supporting surface. An additional feature of the stand 26 allows it to be turned upside down and the grill 20 placed inside the stand 26, as shown in FIG. 20. This allows the stand 26 to be easily stored with the grill 20. The stand 26 is free-standing and needs no other support. The stand 26 is made out of either aluminum or steel in the preferred embodiment.

Figure 21:
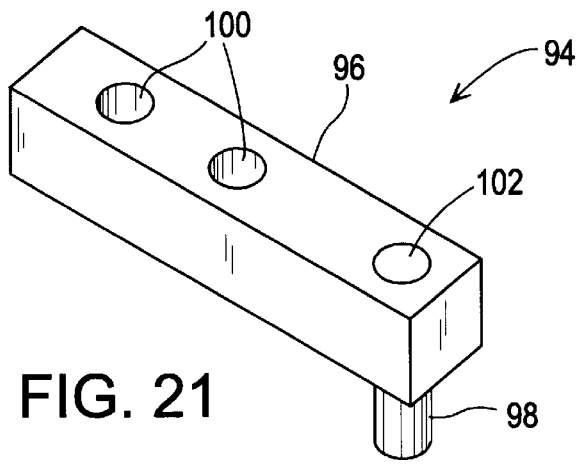
FIG. 21 is a front perspective view of the mounting bracket.

Referring now to FIG. 21, an alternative support for the grill 20, rather than the stand 26, is a mounting bracket 94. The mounting bracket 94 is attached to the bottom of the grill tub 22, as can be seen in FIG. 1. It consists of a flat stainless steel mounting bracket bar 96 with a downward protruding mounting post 98 on one end. The mounting post 98 has a hole and a lock pin in one end (not shown) and threads that screw into the flat bar at the other end (not shown). The mounting post 98 is designed to fit existing mounting hardware for boat grills. The mounting post 98 can also fit into a clamp that attaches to a mounting rod used by most boat owners. Thus, the mounting bracket 94 provides an easy means to use existing mounting equipment and quickly mount the grill to various equipment.

In a preferred embodiment, the mounting bracket 94 is a flat ½" mounting bracket bar 96 of stainless steel and matches the rest of the grill 20. The mounting bracket bar 96 has two mounting bar apertures 100 for fastening it to the bottom of the grill tub 22 and a single threaded hole 102 in the opposite end. The threaded mounting post 98 is screwed into the mounting bracket bar 96. The result is a flat bar protruding from the middle of the grill tub 22 with a downward facing post, as can be seen in FIG. 1.

Figure 22:
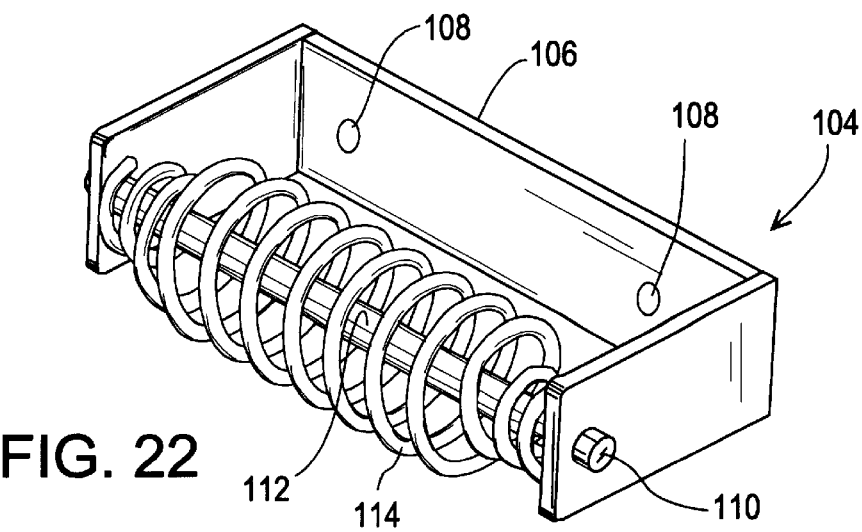
FIG. 22 is a front perspective view of the lid handle.

Referring now to FIG. 22, the lid handle 104 will be described. The lid handle 104 is attached to the front of the grill hood 24, as can be seen in FIG. 1. The lid handle 104 allows the grill hood 24 to be opened when the grill 20 is in operation and the rest of the grill 20 is hot. The lid handle 104 can be touched and grabbed even when the grill 20 is operating at maximum temperature. The design of the lid handle 104 consists of a U shaped bar 106 with mounting holes 108 at each end through which bolts (not shown) are inserted for fastening the lid handle 104 to the grill hood 24. The U shaped bar 106 also has handle holes 110 through which a handle bolt 112 is inserted. The handle bolt 112 is inserted through a coil spring 114 which only touches the U shaped bar 106 at each end of the coil spring 114. This allows the coil spring 114 to have minimal contact with the hot U shaped bar 106 of the lid handle 104, and thus conducts less heat into the coil spring 114. In one embodiment, the coil spring is made of stainless spring steel.

Additionally, the grill 20 can be used in combination with a cooler carrying case. The cooler carrying case serves three functions, first it can be used to provide a place to store and protect the grill 20 when it is not in use. Second, the cooler carrying case can serve as a washout tub for the grill 20, to contain all the ashes and cooking debris that can easily be washed out when cooking is done. Third, the cooler carrying case can serve as a drink or food cooler when not storing the grill 20. The cooler carrying case is a standard cooler, large enough to hold the grill 20, with a custom made insert for stabilizing and holding the grill 20 for storage and transport.

For purposes of clarity, the following is a summary of the various components and designator numbers as designated in the drawings:

Number Component

20 Grill
22 Grill tub
24 Grill Hood
26 Grill Stand
28 Grill cooking surface
30 Heat diffuser
32 Burner
34 Excess grease deflector
36 Grease and ash accumulator
38 Upper baffle
40 Middle baffle
42 Lower Baffle
44 Component stop tabs
45 Entry air ventilation apertures
46 Fuel access port
47 Air ventilation aperture
48 Airflow disruption vein
50 Grease and ash accumulator handle
52 Exit aperture
54 Combustion chamber
56 Airflow notches
57 Fuel conduit
58 Propane control valve assembly
60 Gas mixing venturi
62 Gas inflow pipe
63 Burner holes
64 Propane control valve
66 Propane delivery tube
68 Brass threaded plug
70 Heat diffuser slits
72 Stringers
74 Ventilation ports
76 Slide vent control
78 Slide cradle
80 Slide 82 Slide vent ports
84 Ignition Cover
86 Round plate
88 Aperture
90 Mounting bolt
92 Ignition aperture
94 Mounting bracket
96 Mounting bracket bar
98 Mounting Post
100 Mounting bar apertures
102 Threaded hole
104 Lid Handle
106 U shaped bar
108 Mounting holes
110 Handle holes
112 Handle Bolt
114 Coil Spring It will be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A gas cooking grill adapted for use in high wind conditions, comprising:
   a. a substantially enclosed grill tub having an upper end, a lower end, a fuel access port and at least one entry air ventilation aperture positioned proximate to said lower end;
   b. a hood operatively sized to rest on said upper end of said grill tub during operation of said gas cooking grill;
   c. a grill cooking surface resting within said grill tub which is adapted for supporting a food item;
   d. a burner positioned below said grill cooking surface within said grill tub for providing heat energy to the food item;
   e. a fuel conduit extending through said fuel access port which is interconnected to said burner on a first end and adapted for interconnection to a fuel source on a second end;
   f. at least one baffle with at least one air ventilation aperture positioned below said burner and positioned offset from said entry air ventilation aperture, wherein as air enters from said entry air ventilation aperture and travels through said at least one air ventilation aperture in said baffle, a velocity of said air decreases prior to coming into contact with said burner.

2. The gas cooking grill of claim 1, wherein at least two baffles are stacked in an opposing vertical relationship within said gas grill tub, wherein each of said at least one air ventilation aperture in said baffles are positioned offset from one another.

3. The gas cooking grill of claim 1, further comprising an excess grease deflector positioned below said burner to catch excess cooking grease and ash falling from said grill cooking surface.

4. The gas cooking grill of claim 1, further comprising a removable grease and ash accumulator for storing grease and ash collected on said excess grease deflector.

5. The gas cooking grill of claim 1, further comprising a heat diffuser positioned between said burner and said grill cooking surface to provide substantially uniform heat distribution to said grill cooking surface from said burner.

6. The gas grill of claim 1, wherein said fuel source is propane or natural gas.

7. The gas grill of claim 1, wherein said baffles and associated air ventilation apertures are positioned to create a serpentine flow path between said entry air ventilation aperture and said burner.

8. The gas grill of claim 1, wherein said baffles are supported within said grill tub on a component stop tab.

9. The gas grill of claim 1, wherein said baffles have a substantially planar surface with a top end, a bottom end, a plurality of apertures extending there between and an airflow disruption vein extending outwardly from said bottom surface in a direction substantially parallel to a longitudinal axis of said baffle.

10. The gas grill of claim 1, wherein said hood is hingedly interconnected to said grill tub.

11. The gas grill of claim 1, wherein said hood has at least one adjustable hood ventilation port for controlling the volume of air traveling through said gas grill.

12. A method for heating a food product on a gas grill in high wind conditions, comprising the steps of providing a gas cooking unit having:
   a. a substantially enclosed grill tub having an upper end, a lower end, a fuel access port and at least one entry air ventilation aperture positioned proximate to said lower end;
   b. a hood operatively sized to rest on said upper end of said grill tub during operation of said gas cooking grill;
   c. a grill cooking surface resting within said grill tub which is adapted for supporting a food item;
   d. a burner positioned below said grill cooking surface within said grill tub for providing heat energy to the food item;
   e. a fuel conduit extending through said fuel access port which is interconnected to said burner on a first end and adapted for interconnection to a fuel source on a second end;
   f. at least one baffle positioned below said burner which has at least one air ventilation aperture positioned offset from said ventilation aperture;
   g. circulating combustion air from said entry air ventilation aperture positioned proximate to said lower end of said grill tub to said burner in a serpentine path, wherein said air flow changes direction at least 90 degrees at least three times prior to reaching said burner.

13. The method of claim 12, further comprising the step of adjusting a ventilation port located within a hood of said gas cooking unit to control the total volume of combustion air circulating through said gas grill.

14. A gas grill adapted for use in inclement weather conditions, comprising:
   a grill housing, said grill housing consisting of a grill hood and a grill tub;
   said grill hood having at least one ventilation port for air ventilation;
   said grill tub having at least one access air ventilation port, a fuel port for receiving a fuel conduit, a plurality of baffles positioned therein, a combustion chamber, a burner unit and a grill cooking surface; and
   said plurality of baffles having at least one air ventilation aperture, said plurality of baffles being positioned in a vertical stacking relationship within said grill tub such that the air ventilation apertures in each baffle are offset within the grill tub to create a serpentine air flow path through said baffles between said access air ventilation port and said burner.

15. The gas grill of claim 14, further comprising a stand interconnected to a lower end of said grill tub.

16. The gas grill of claim 14, wherein said grill hood includes at least one slide vent control for controlling the volume air flow through said at least one air ventilation port.

17. The gas grill of claim 14, wherein said fuel conduit consists of a propane control valve assembly, a gas inflow pipe, and a gas mixing venturi.

18. The gas grill of claim 17 wherein said gas mixing venturi is located within said grill tub.

19. The gas grill of claim 17 wherein said gas mixing venturi is located outside of said grill tub and has a wind shield cover consisting of a tube section larger in diameter than the gas mixing venturi and having at least one ventilation aperture.

20. The gas grill of claim 14 wherein said grill tub additionally contains an excess grease deflector positioned below said grill cooking surface, and a grease and ash accumulator positioned below said excess grease deflector, wherein said excess grease deflector deflects excess grease and ash through an exit port and into said grease and ash accumulator.

21. The gas grill of claim 14, wherein said burner unit is located within said combustion chamber having at least one baffle positioned below said combustion chamber, and a heat diffuser positioned above said combustion chamber.

22. The gas grill of claim 21, wherein said heat diffuser provides substantially uniform heat distribution to said grill cooking surface from said burner and substantially reduces a wind velocity at said burner unit as compared to the wind velocity outside said gas grill.

* * * * *